Nov. 5, 1968    G. W. BICKEL    3,409,369
LASER RADAR
Filed April 30, 1964

INVENTOR.
GARY W. BICKEL
BY Charles J. Ungemach
ATTORNEY

3,409,369
LASER RADAR
Gary W. Bickel, Natick, Mass., assignor to Honeywell, Inc., Minneapolis, Minn., a corporation of Delaware
Filed Apr. 30, 1964, Ser. No. 363,734
6 Claims. (Cl. 88—1)

This invention relates to a Doppler velocity measuring apparatus and more particularly to a system utilizing very high transmission frequencies such as found in the light from a laser for measuring the speed of an object relative to the system. Although various sources of controlled frequency radiation may be employed in this invention, as for example, microwave and radio waves, for reasons of simplicity and accuracy the present invention is described in its preferred embodiment as using lasers which are a particularly convenient source of high frequency, coherent radiation.

In the simplest form, previous Doppler systems found in radar have combined the reflected Doppler-shifted signal from the target with a signal taken directly from the transmitter. The combination produces a beat frequency which is directly proportional to the velocity of the target and to the frequency of the transmitted signal. Since the frequency of the transmitter signal is known, measuring the frequency of the beat signal results in a measure of the target velocity relative to the radar system.

A serious difficulty is encountered in measuring high velocities like those of a missile or in using high transmission frequencies as are found in laser systems because high velocities and high transmission frequencies produce beat signals with frequencies so great that they are very difficult to measure. The present invention produces a much lower beat frequency so that the advantages of a laser, lightweight and simplicity of construction, can be had without reducing the high velocity measuring capability.

Briefly, the present invention overcomes the previous disadvantages by utilizing a second transmitted frequency which is slightly different from the first transmitted frequency. Since the beat signal frequency is proportional to the target velocity and the transmitted frequency and since there are two transmitted frequencies, first and second beat signals are produced whose frequencies are slightly different from each other by the same fraction as the two transmitted frequencies. If the target velocity is relatively small, the present invention measures the average frequency of the beat signals to determine the target velocity in a conventional manner. However, if the target velocity becomes so large that this average beat frequency is too large to measure a mode selection apparatus in this invention allows the frequencies of the two beat signals to be compared. Since these two frequencies are slightly different the beat frequencies will go in and out of phase causing an amplitude modulation whose frequency is proportional to the difference in the two beat signals and the velocity of the target. The difference in the two beat signals is proportional to the difference in the two transmitted signals so the frequency of the amplitude modulation is proportional to the target velocity and the difference in the two transmitted signals.

For example, in a typical helium-neon laser operating at the frequency of light or about $10^{14}$ cycles per second, a natural two frequency output is often observed. The difference in the two frequencies is equal to the speed of light C divided by twice the length L of the laser cavity, or about one millionth of the first transmitted frequency.

The first beat frequency $f_{B1}$ is proportional to the target velocity V and the first transmitted frequency $f_{t1}$.

$$f_{B1} = kVf_{t1} \quad (1)$$

where $k$ is a constant of proportionality. The second beat frequency $f_{B2}$ is proportional to the target velocity and the second transmitted signal $f_{t2}$.

$$f_{B2} = kVf_{t2} \quad (2)$$

The second transmitted signal is equal to the first transmitted signal plus the difference between the first and second transmitted signals which is C divided by two L or about one millionth of the first transmitted signal.

$$f_{t2} = f_{t1} + \frac{C}{2L} \quad (3)$$

Therefore, from Equations 2 and 3, $$f_{B2} = kV\left(f_{t1} = \frac{C}{2L}\right) \quad (4)$$

and since the frequency of the amplitude modulation $f_m$ is equal to the difference in the two beat frequencies $$f_m = f_{B2} - f_{B1} \quad (5)$$

then from Equations 1 and 4

$$f_m = kV\left(f_{t1} + \frac{C}{2L}\right) - kVf_{t1} \quad (6)$$

or, $$f_m = kV\left(\frac{C}{2L}\right) \quad (7)$$

Since C divided by two L is about one millionth of the first transmitted frequency $$f_m = kV\left(\frac{f_{t1}}{10^6}\right) \quad (8)$$

the frequency of modulation $f_m$ is seen to be about one million times slower than the ordinary beat frequency shown in Equation 1. As can be seen, measuring the beat amplitude modulation frequency in a typical laser Doppler system is much easier than measuring the beat frequency directly as a conventional Doppler radar operation does because the modulation frequency is a million times slower. Thus, a much more usable velocity indicator is provided.

Accordingly it is an object of this invention to provide an improved Doppler system capable of measuring higher velocity and employing higher frequencies.

The details of the present invention will be further explained and clarified in the following description and drawings in which.

Figure 1:
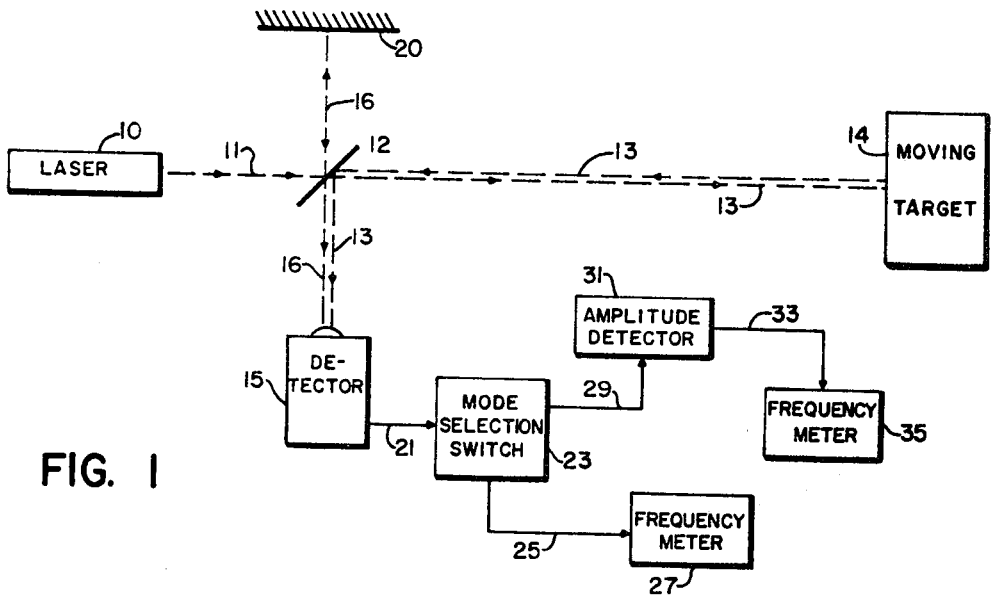
FIGURE 1 is a schematic drawing of one embodiment of my invention.

In FIGURE 1 a laser 10 generates a beam of light having two frequency components along path 11 toward semi-silvered mirror or beamsplitter 12. At beamsplitter 12 most of the beam passes through and follows path 13 toward a moving target 14 where the two components reflect and experience a Doppler shift. These reflected Doppler phase shifted components travel back along path 13 to beamsplitter 12 where they are reflected downward towards a detector 15.

At beamsplitter 12 a small portion of the beam coming from laser 10 along path 11 is reflected upward along path 16 toward a mirror 20 where it is reflected back down through beamsplitter 12 to detector 15 to be compared with the Doppler shifted beam. Beamsplitter 12 and mirror 20 are arranged so that beams traveling in paths 13 and 16 will arrive at detector 15 with a small angle between them. This angle causes an interference fringe pattern to appear at detector 15 because of alternate constructive and destructive components. These bands of light interaction move past detector 15 at a rate proportional to the target velocity so that an alternating signal appears on detector 15. The frequency of this alternating signal is proportional to target velocity. Detector 15 may be a photomultiplier tube or any device which responds to incident light energy.

Detector 15 produces an output signal on a conductor 21 which is presented to a mode selector switch 23. If target 14 is moving relatively slow, the mode selection switch 23 is caused to operate so that the signal from detector 15 is passed through on a conductor 25 to a frequency meter 27 which indicates the velocity. Mode switch 23 can be a manual switch or any suitable automatic device which switches modes in accordance with predetermined frequency ranges. When the velocity of the target is relatively slow each of the two transmitted waves combines with its Doppler shifted component to form two beats which are slightly different, for example by one part in a million as was shown before to be typical. Ignoring the amplitude modulation caused by the slightly different beat frequencies, meter 27 cannot tell the difference between the two beat frequencies and thus measures only the average beat frequency which is directly proportional to the target velocity. A suitable scale may be affixed to meter 27 to indicate the target velocity.

When the target velocity is high the beat frequency becomes too large to measure with meter 27 since with increasing target velocity, the rate of change of the fringe pattern appearing at detector 15 increases until the apparatus can no longer respond to the high frequency involved. When this situation occurs, mode selection switch 23 is caused to transmit the output from detector 15 along a conductor 29 to amplitude detector or demodulator 31 and thence along a conductor 33 to a frequency meter 35. The output from detector 15 is now comprised of a carrier frequency too great to be useful in measuring but which is modulated at a very much lower frequency signal. The frequency of this modulating signal is proportional to the velocity of the target as seen from Equation 7 and so when the output from detector 15 is demodulated by demodulator 31, frequency meter 35 will respond in a manner indicative of the velocity of the target. Therefore, a velocity indicator 35 is provided which is one million times slower than the meter 27. As before, a velocity scale may be attached to meter 35.

Figure 2:
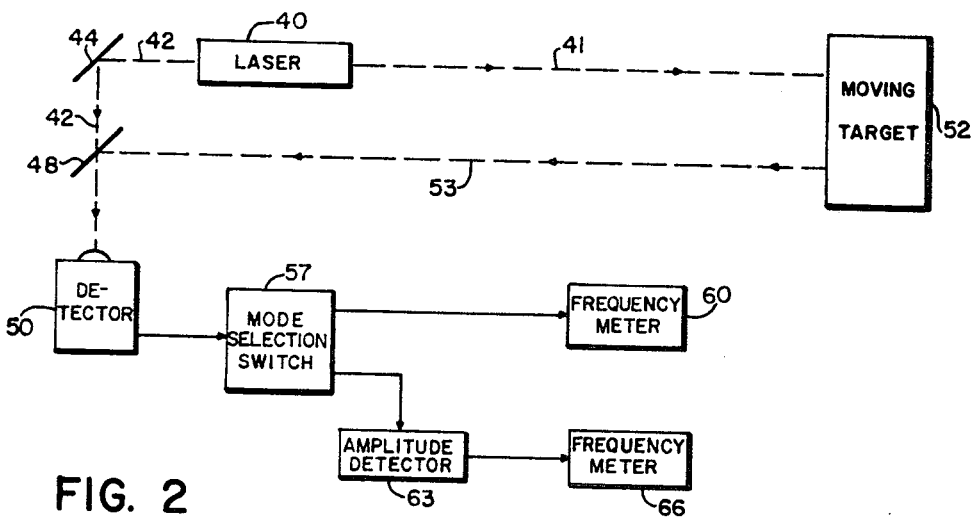
FIGURE 2 is a schematic drawing of another embodiment of my invention.

In FIGURE 2 a schematic drawing of another embodiment of the present invention is shown. FIGURE 2 shows a laser 40 generating two beams each having two frequency components in opposite directions along paths 41 and 42. The two components in path 42 are reflected from a mirror 44 down through a beamsplitter 48 to a light detector 50. The light detector 50 may be the same as detector 15 in FIGURE 1. The two components in path 41 experience a Doppler-shift when reflected off of moving target 52 and return along path 53 to beamsplitter 48 where they are reflected downward to detector 50 to be compared with the original two components. Mirror 44 and beamsplitter 48 are arranged such that the beam traveling along path 53 arrives at the detector 50 with a slight angle relative to the beam traveling along path 42 in order to produce an interference fringe pattern as already described. The signal from detector 50 is transmitted to a mode switch 57 where it thence goes to either a frequency meter 60 which reads the average beat frequency or to amplitude detector or demodulator 63 and frequency meter 66 which read the frequency of cancellation of the two slightly different beat frequencies in the same manner as previously explained.

It is not necessary that the present invention be limited to only two frequencies. Three or more frequencies, although increasing the complexity of operation, may be used in this device. If more than two frequency components exist any two may be selected by filters or the like and used in the manner described above.

Although the present invention has been described with respect to lasers it should be understood that two synchronized microwave transmitters with the appropriate receiving equipment could be used to accomplish the same result. It will be obvious to those skilled in the art that many modifications and variations of this device can be made without departing from the scope and spirit of the invention as defined by the claims.

I claim as my invention:

1. A Doppler radar device comprising:
   means to generate a plurality of electromagnetic waves;
   means to receive Doppler shifted reflections of said plurality of electromagnetic waves from moving objects;
   means to beat the frequencies of said plurality of waves with their respective Doppler shifted reflection frequencies to produce Doppler shift frequencies;
   means to combine said Doppler shift frequencies to generate an amplitude modulated signal the frequency of which is indicative of velocity of the moving objects; and
   means to indicate the frequency of the amplitude modulated signal.

2. A Doppler radar device comprising:
   means to generate first and second frequency electromagnetic waves;
   means to receive Doppler shifted reflections of said first and second frequency waves from moving objects;
   means to generate a first difference beat frequency between said first frequency wave and said Doppler shifted reflection of said first frequency wave;
   means to generate a second difference beat frequency between said second frequency wave and said reflection of second frequency wave; and
   means to indicate the relative phase of said first and second beat frequencies as a measure of the velocity of the moving objects.

3. A laser Doppler radar device comprising:
   a laser generating a light beam having first and second frequency components toward a target to be reflected thereby to produce a reflected Doppler shifted first and second component;
   means to mix the reflected Doppler shifted first and second frequency components with a portion of said first and second frequency components so as to form first and second interference fringe patterns respectively; and
   means to measure the relative rate of change between the first and second fringe pattern as an indication of the velocity of the target.

4. A Doppler radar device in which a laser generates a plurality of frequencies of light waves toward a target where they are reflected experiencing a Doppler-shift proportional to the velocity of said target comprising:
   an optical system to combine said plurality of waves with their respective Doppler-shifted components so as to form interference fringe patterns;
   a detector to measure the absolute and relative rate of change of said fringe patterns as an indication of velocity; and
   a mode selection switch to determine if said absolute or said relative rate of change will be measured.

5. Apparatus for determining the velocity of a moving object comprising, in combination:
   a laser having an output beam directed toward the object and to be reflected thereby, said output beam having first and second components of different frequency which when reflected by the object form a reflected beam having a Doppler shifted first and second components;

detector means operable to produce an output in accordance with the intensity of light received thereby;

means reflecting a portion of the output beam and a portion of the reflected beam to said detector, the first component and the Doppler shifted first component forming a first interference fringe pattern which moves at a first speed proportional to the speed of the object, the second component and the Doppler shifted second component forming a second interference fringe pattern which moves at a second speed proportional to the speed of the object, the first and second fringe patterns causing periodic increase and decrease in the intensity of light at said detector means, the frequency of the periodic increase and decrease in intensity being a function of the speed of the object; and frequency measuring means connected to said detector to provide an indication of the speed of the object.

6. Apparatus for determining the speed of objects moving at velocities in a slow range and in a fast range comprising:

means producing an output beam of electromagnetic energy directed toward a moving object, said output beam having first and second components of different frequency, said output beam being reflected from the object to produce a reflected beam having first and second Doppler shifted components;

detector means operable to produce an output in accordance with the level of electromagnetic energy received;

means directing a portion of the output beam and a portion of the reflected beam to said detector, the first component and the first Doppler shifted component forming a first interference fringe pattern which moves with respect to the detector to produce a first periodic variation of the level of electromagnetic energy received by said detector means at a first frequency proportional to the speed of the object, the second component and the second Doppler shifted component forming a second interference fringe pattern which moves with respect to the detector to produce a second periodic variation of the level of electromagnetic energy received by said detector means at a second frequency proportional to the speed of the object, the first and second fringe patterns combining to produce a third periodic variation in the level of electromagnetic energy received by said detector means at a third frequency proportional to the speed of the object, said third frequency being several orders of magnitude less than the first and second frequencies;

switch means having first and second positions and being connected to said detector means;

first frequency responsive means connected to said switch means, said switch means in the first position transmitting the output of said detector means to said first frequency responsive means, said first frequency meter responding to the average of said first and second frequencies to produce an indication of the speed of the object when moving in the slow range; and second frequency responsive means connected to said switch means, said switch means in the second position transsmitting the output from said detector to said second frequency responsive means responding to the third frequency to produce an indication of the speed of the object when moving in the fast range.

References Cited

UNITED STATES PATENTS 3,018,477   1/1962   Brault _____ 343—7.7

JEWELL H. PEDERSEN, *Primary Examiner.*

B. LACOMIS, *Assistant Examiner.*